Oct. 22, 1963 B. F. SKINNER 3,107,435
TEACHING AND TESTING MACHINES
Filed Feb. 5, 1962

INVENTOR
Burrhus F. Skinner
BY
Pennie, Edmonds, Morton, Barrows & Taylor
ATTORNEYS

United States Patent Office 3,107,435
Patented Oct. 22, 1963

3,107,435
TEACHING AND TESTING MACHINES
Burrhus F. Skinner, Cambridge, Mass.
Filed Feb. 5, 1962, Ser. No. 171,193
5 Claims. (Cl. 35—9)

This invention relates to teaching and testing machines, and in particular to a device for the prevention and detection of cheating by users of such machines.

A teaching and testing machine is a device which presents to the user of the machine (for example, a student) a carefully constructed program of instructional or testing material consisting of a series of interrelated items or questions designed to teach or to test the user's knowledge of a specific subject matter or a portion thereof. The programmed material presented by the machine is usually carried on a strip of paper or similar material, or on a strip of film for projection onto a screen or the like, referred to herein as the question strip; and if the material is presented in the form of a series of questions to be answered by the user of the machine, the correct answer to these questions also usually appears on the question strip. Such machines are usually designed to present one item or question of the programmed material at a time, and means are provided for permitting the user of the machine to write or otherwise indicate on a separate answer strip what the user believes to be the correct answer to the question then being presented by the machine. After the user has written down or otherwise indicated his answer to the question, and while the question is still visible to the user, the correct answer to the question is revealed by the machine. After the user of the machine has compared his own answer with the correct answer to the question now revealed by the machine, the question strip is moved through the machine by an appropriate mechanism in order to present the next succeeding question to the user, and at the same time the answer strip is moved to provide a fresh or unmarked portion thereof on which the user can indicate the answer to the next question of the programmed material.

The question strip on which the programmed material appears and the answer strip on which the user of the machine marks or otherwise indicates his answer normally move through the machine in phase with each other so that for each successive portion of the question strip (on which successive portions the successive questions of the programmed material appear) there is a corresponding successive portion of the answer strip. As a consequence, after the user of the machine has marked or otherwise indicated on the answer strip his answers to all of the questions appearing on the question strip, the answer strip can be removed from the machine and the answers marked thereon can be graded by direct comparison with a set of correct answers spaced the same distance apart as the answers on the answer strip. As previously mentioned, after the user of the machine has marked on the answer strip his answer to the question then being presented by the machine, the machine reveals the correct answer to this question for the purpose of immediate comparison with the user's answer. In order to prevent the user from changing the answer he has just marked on the answer strip after the machine has revealed the correct answer to the question then being presented, the machine is normally provided with means which bars access to the answer strip while the correct answer is revealed by the machine. However, when using a teaching machine in which a separate answer strip is moved in phase with a question strip carrying programmed material, it is nonetheless possible for the user to cheat (that is, to prepare what appears to be a properly executed set of answers) by writing the answer to the preceding question (the answer to which question the machine has just revealed) on the portion of the answer strip corresponding to the question now being presented by the machine.

I have now discovered means by which the last-mentioned form of cheating can be prevented or, if practiced, can be detected. Namely, I have found that the introduction of a space of non-uniform size between successive items or questions in the programmed material will prevent or detect such cheating. These irregular spaces may be introduced between successive items or questions more or less at random, and only one such space is needed for each group or set of items or questions. As a result of the presence of these non-uniform, randomly distributed spaces between items and groups of items on the question strip, answers properly marked on the answer strip by the user should be separated from each other by spaces of corresponding size and distribution. If the user of the machine is writing on the answer strip an answer to the preceding question rather than to the question then being presented by the machine, the answers which he writes on the answer strip after each of the aforementioned spaces will appear on the answer strip on the wrong side of the space (that is, after the space rather than before the space) and thus will detect the fact that he has been cheating. Accordingly, my improvement in teaching and testing machines in which a question strip carrying programmed material and a separate answer strip are moved in phase with one another comprises the provision of a question strip on which successive questions appear on the strip separated from each other by spaces of non-uniform size.

My improvement in teaching and testing machines will be better understood from the following description taken in conjunction with the accompanying drawings of which:

Figure 1:
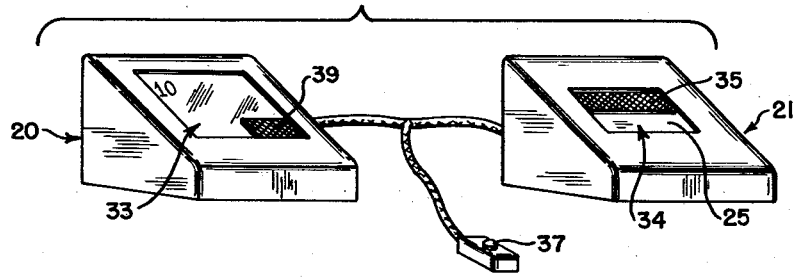
FIG. 1 is a perspective view of a multi-unit teaching and testing machine in which my anti-cheating device is employed.
Figure 2:
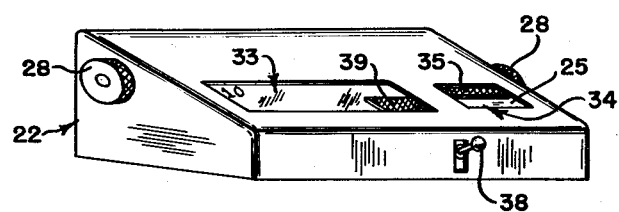
FIG. 2 is a perspective view of a single unit teaching and testing machine in which my anti-cheating device is employed.
Figure 3:
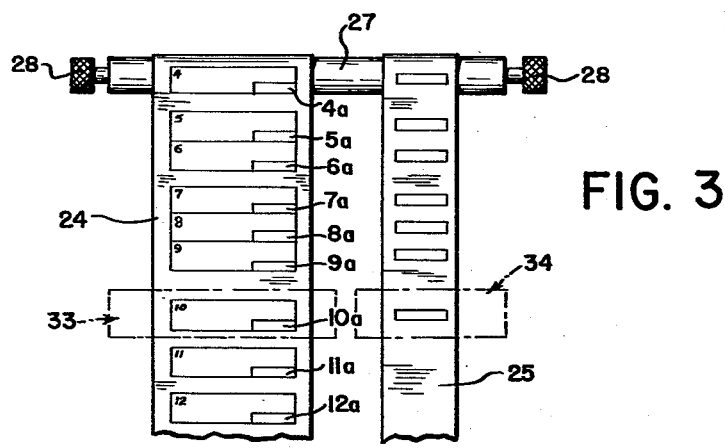
FIG. 3 is a semi-schematic view of the mechanism of a manually operated machine employing a paper question strip embodying my invention.
Figure 4:
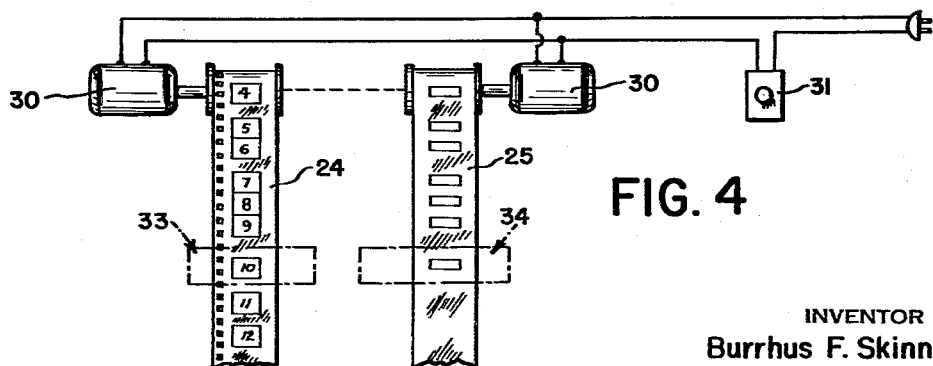
FIG. 4 is a semi-schematic view of the mechanism of an electrically operated machine employing a film question strip embodying my invention.

My improved anti-cheating device for teaching and testing machines is applicable to all such machines in which a question strip carrying programmed material is moved in phase with a separate answer strip on which the user of the machine marks or otherwise indicates his answers to the questions appearing on the question strip. Thus, the machine may comprise separate but interconnected units 20 and 21 housing the question strip and the answer strip, respectively, as shown in FIG. 1, or it may comprise a single unit 22 housing both strips as shown in FIG. 2. Moreover, the question strip 24 on which the programmed material appears may be of paper or similar material as shown in FIG. 3, or it may be of transparent film suitable for direct viewing or projection as shown in FIG. 4. The answer strip 25 on which the user of the machine writes or otherwise indicates his answers to the questions appearing on the question strip 24 usually is an unmarked paper strip similar to adding machine tape, although other materials may be used and the strip may carry various markings (e.g., numbers or boxes or the like) for use in indicating appropriate answers thereon.

In all cases, whether the machine consists of single or multiple units or is of the direct viewing or projection type, the mechanism of the machine moves the question strip 24 and the answer strip 25 through the machine in phase with each other so that for each successive portion of the question strip there is a corresponding successive portion of the answer strip. Thus, as shown in FIG. 3, in a mechanically operated machine the mechanism for moving the question strip and the answer strip through the machine advantageously comprises a roller 27 (or an equivalent device) in frictional contact with both strips which draws both strips uniformly through the machine when the knobs 28 are manually rotated by the user of the machine. Similarly, as shown in FIG. 4, in an electrically operated machine the strip-advancing mechanism advantageously comprises a pair of electrically interconnected servo motors or step solenoids 30 (or equivalent devices) which simultaneously advance both strips the same, or a proportionately similar, amount when the control 31 is actuated by the user of the machine. When the question strip 24 is a transparent photographic-type film on which each question appears in a separate frame of the film strip, the strip-advancing mechanism, whether mechanically or electrically operated, advantageously advances the question strip through the machine one frame at a time, the answer strip simultaneously being advanced in step-wise fashion a corresponding (but not necessarily the same) distance.

Moreover, in all cases the machine is provided with a question station 33 and an answer station 34 at which the successive corresponding portions of the question strip 24 and the answer strip 25 are visible to the user of the machine. The question station 33 may be an opening or window formed in the top or other part of the machine casing through which the question (e.g. Question 10) then at the question station may be directly viewed, or it may be a screen or ground glass onto which the question is optically projected by the machine. The answer station 34 must provide access to the portion of the answer strip thereat and as a result it usually is a rectangular opening formed in the top or other part of the machine casing. In addition, the answer station is usually provided with means such as the movable shield 35 which bars access to the answer strip when the correct answer to the question then being presented is revealed by the machine.

The programmed material appearing on the question strip 24 consists of a series of interrelated items or questions represented in FIGS. 3 and 4 of the drawing by the rectangular boxes numbered 4 through 12, respectively. Moreover, in the usual case each question of the programmed material is accompanied by the correct answer to this question, the correct answers appearing on the question strip at a designated position with respect to the question to which each refers and being represented in FIG. 3 by the small rectangular boxes numbered 4a through 12a, respectively. In accordance with my invention, successive questions on the question strip are separated from each by spaces of non-uniform size (i.e., the spacing between one pair of adjacent questions on the question strip is not necessarily the same as the spacing between another pair of adjacent questions on the strip). These non-uniform spaces may be introduced between successive questions or groups of questions more or less at random, and only one such space is needed between each set or group of questions. Thus, referring to the question strip 24 shown in FIG. 3, Questions 5 and 6 and Questions 7, 8 and 9 are separated from each other by nominal or single spaces (to use typewriter terminology), Questions 4 and 5 and Questions 6 and 7 are separated from each other by double spaces, Questions 9 and 10 are separated from each other by triple space, and so on. Similarly, assuming the question strip shown in FIG. 4 to be a photographic-type film strip on which each individual question appears in a separate frame of the film, Questions 5 and 6 and Questions 7, 8 and 9 are separated from each other by the nominal or ordinary spacing between successive frames on the film, Questions 4 and 5 and Questions 6 and 7 are separated from each other by a single unused frame, Questions 9 and 10 are separated from each other by two unused frames, and so on.

Question strips embodying my invention are employed in a conventional manner in machines that move the question strip and a separate answer strip through the machine in phase with each other. Thus, assuming the machine has moved the question strip 24 to bring a new question (e.g., Question 10) into view at the question station 33 and at the same time has moved the answer strip 25 so that the corresponding portion thereof is accessible at the answer station 34, the user of the machine first studies the question being presented and then writes or otherwise indicates his answer to the question on the portion of the answer strip then at the answer station. The user then manipulates the controls of the machine to cause the machine to reveal the correct answer to the question under consideration and simultaneously to bar access to the visible portion of the answer strip 25 on which the user has indicated his answer. (For example, depression of the control button 37 of the multi-unit machine of FIG. 1 or downward movement of the control lever 38 of the single unit machine of FIG. 2 will, in both cases, cause the mask 39 which ordinarily conceals the correct answer appearing on the question strip 24 to be withdrawn to reveal this correct answer and simultaneously will cause the transparent shield 35 to be moved over the visible portion of the answer strip 25 to bar access to this portion of the strip.) After the user has compared his written answer to the question under consideration with the correct answer as now revealed by the machine, the controls are again manipulated (for example, by release of the control button 37 of the multi-unit machine of FIG. 1 or by rotation of the knobs 28 of the single unit machine of FIG. 2) to cause the machine to advance the question strip 24 and the answer strip 25 so as to present the next succeeding question on the question strip at the question station 33 and to present the corresponding portion of the answer strip at the answer station 34, the mask 39 simultaneously being returned to its normal position concealing the correct answer on the question strip 24 and the transparent shield 35 also simultaneously being withdrawn to its normal position which allows access to the portion of the answer strip 25 appearing at the answer station.

This procedure is repeated until all questions on the answer strip have been answered by the user of the machine. The answer strip with the answers marked thereon is then removed from the machine for the purpose of grading the answers given by the user. If the answers have been properly entered or marked on the answer strip by the user, the answers should be separated from each other by spaces corresponding in size and distribution to the spaces which separate successive items or questions on the question strip. However, if the user of the machine has attempted to cheat by writing on the answer strip an answer to the preceding question rather than to the question then being presented by the machine, the answers which he has written or otherwise indicated on the answer strip will appear on the wrong side of the spaces between answers on the answer strip (that is after the spaces rather than before the spaces) and thus will detect the fact that he has been cheating.

From the foregoing description of my new anti-cheating device it will be seen that I have made an important contribution to the art to which it relates.

I claim:

1. In a teaching and testing machine in which a separate answer strip is moved in phase with a question strip carrying programmed material, the machine having a question-and-answer station through which the answer strip and the question strip are moved and at which successive portions of said strips are visible to the user of the machine, the answer strip being accessible to said user at said station for the purpose of marking thereon an appropriate answer to the question on the corresponding portion of the question strip then appearing at the question-and-answer station, the improvement which comprises providing a question strip on which successive questions of the programmed material appearing on the strip are separated from each other by spaces of non-uniform size.

2. In a teaching and testing machine in which a separate answer strip is moved in phase with a question strip carrying programmed material comprising a plurality of successive questions, the machine having a question station and an answer station at which successive corresponding portions of the question strip and the answer strip are visible to the user of the machine, the answer strip being accessible to said user at the answer station for the purpose of marking thereon an appropriate answer to the question on the corresponding portion of the question strip then appearing at the question station, the improvement which comprises providing a question strip on which successive questions of the programmed material appearing on the strip are spaced from each other at random intervals.

3. A teaching and testing machine in which a separate answer strip is moved in phase with a question strip carrying programmed material comprising a plurality of successive questions, the machine having a question station and an answer station at which successive corresponding portions of the question strip and the answer strip are visible to the user of the machine, the answer strip being accessible to said user at the answer station for the purpose of marking thereon an appropriate answer to the question on the corresponding portion of the question strip then appearing at the question station, the plurality of successive questions appearing on the question strip being separated from each other by randomly distributed spaces of non-uniform size.

4. A question strip carrying programmed material for use in a teaching and testing machine in which the question strip and a separate answer strip are moved in phase, the machine having a question station and an answer station at which successive corresponding portions of the question strip and the answer strip are visible to the user of the machine, successive items of the programmed material appearing on the question strip being separated from each other by spaces of non-uniform size.

5. A question strip carrying programmed material for use in a teaching and testing machine in which the question strip and a separate answer strip are moved in phase, the programmed material on the question strip comprising a plurality of successive questions, the machine having a question station and an answer station at which successive corresponding portions of the question strip and the answer strip are visible to the user of the machine, the answer strip being accessible to said user at the answer station for the purpose of marking thereon an appropriate answer to the question of the corresponding portion of the question strip then appearing at the question station, successive items of the programmed material appearing on the question strip being separated from each other by spaces of non-uniform size.

References Cited in the file of this patent
UNITED STATES PATENTS 2,690,621  Dean _____ Oct. 5, 1954
2,987,828  Skinner _____ June 13, 1961